April 20, 1937.  S. E. SNYDER  2,077,646
FLUID CONTROL FOR HYDRAULIC BRAKE SYSTEMS
Filed March 31, 1936
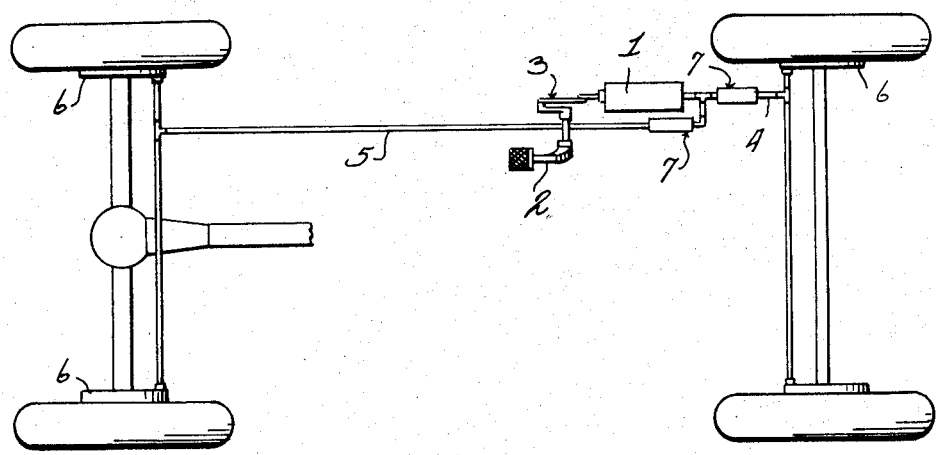
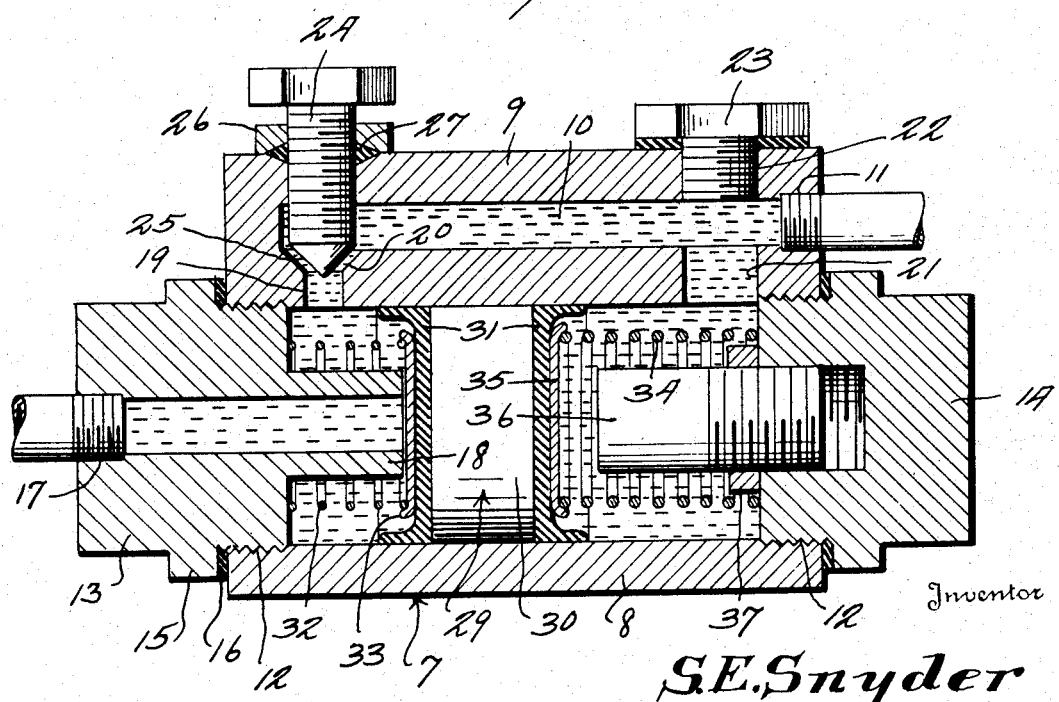
Inventor
S. E. Snyder
By Watson E. Coleman
Attorney Patented Apr. 20, 1937

2,077,646

UNITED STATES PATENT OFFICE 2,077,646

FLUID CONTROL FOR HYDRAULIC BRAKE SYSTEMS

Sheridan E. Snyder, Rochester, Pa.

Application March 31, 1936, Serial No. 71,893

6 Claims. (Cl. 303—84)

This invention relates to improvements in braking systems of wheeled vehicles and pertains particularly to the fluid or hydraulic braking systems of motor vehicles.

The design of hydraulic braking systems at present employed upon motor vehicles is such that the development of a leak or break in the fluid lines of a system will entirely disrupt the system so that none of the brakes can be made to operate. Such breaks or leaks in the system may occur as the result of the sudden application of the brake while travelling at a high speed, so that the suddenly developed high pressure starts a leak at a poor connection or at a worn cylinder cup or may result in the splitting or bursting of one of the lines, or a slow leak may develop while a car is standing with the result that after the user returns and starts up the vehicle, he will discover that no pressure can be developed in the lines for the application of the brake.

The present invention has for its primary object to provide a means whereby the hydraulic braking system of a motor vehicle can be made safe and dependable and positive in its action and whereby the failure of one brake cylinder will not prevent the operation of the cylinders and brakes at the pair of wheels at the end of the vehicle opposite that at which the broken down cylinder is located.

A further object of the invention is to provide an improved fluid control cylinder, of which two are used in each hydraulic brake system and each is interposed in the line running from the master cylinder to a pair of brake cylinders whereby the lines from the master cylinder to the front and rear pairs of brake cylinders are separated from the master cylinder and from one another in such a manner that the failure of a line leading to one pair of brake cylinders will not prevent the operation of the other pair of brake cylinders when the master cylinder controlling foot pedal is operated.

A still further object of the invention is to provide a fluid control unit which is so designed that the filling of the hydraulic system can be effected without the formation of any air pockets therein which would interfere with the proper operation of the system.

Still another object of the invention is to provide an improved fluid control unit which includes a piston actuated by the fluid of the master cylinder and which transmits motion to the brake cylinders, wherein novel means is provided for controlling the degree of movement of said piston whereby a standard size of unit may be provided for use on all types of vehicles, which may be adjusted to suit the necessary degree of fluid movement for the operation of the brakes of the vehicle in which the control unit is used.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view diagrammatically illustrating the lines of a hydraulic braking system for a motor vehicle, showing the location therein of the control unit embodying the present invention.

Figure 2 is a view in vertical longitudinal section through a control unit.

Referring now more particularly to the drawing, wherein like numerals of reference designate corresponding parts throughout the several views, the usual layout of a motor vehicle hydraulic brake system, as diagrammatically illustrated in Figure 1, comprises a master fluid containing cylinder 1, located adjacent the motor vehicle foot pedal 2 and having mechanism 3 coupling the foot pedal 2 with a piston (not shown) in the cylinder which, when actuated by the oscillation of the foot pedal, discharges into the forwardly and rearwardly leading fluid lines 4 and 5 respectively, fluid for the actuation of cylinder enclosed pistons (not shown) located adjacent to and connected with the brakes for the vehicle wheels, which brakes are generally designated by the numerals 6. In the present systems, if either of the lines 4 or 5 should break or spring a leak, the operation of the piston in the master cylinder by the foot pedal 2 would be ineffective to apply any of the brakes. With the use of the device embodying the present invention in the system, if the line leading to the front brakes should fail, the system would still remain operative insofar as the rear brakes are concerned and vice versa. These units are indicated in the diagram constituting Figure 1 by the numerals 7 and, as shown, each complete hydraulic system employs two of the fluid control units, one of which is interposed between the master cylinder and the operating cylinders for the front brakes, in the line 4, while the other fluid control unit is interposed in the line 5 adjacent to and between the master cylinder and the cylinders controlling the brakes for the rear wheels.

Figure 2 illustrates in vertical longitudinal section the detailed construction of a fluid control unit 7. This unit, as shown, comprises a cylinder 8 having cast integral therewith and extending longitudinally thereof, the thickened portion 9 which has the central passage or bore 10 extending longitudinally thereof and opening through one end, the interior of the bore at this open end being threaded, as indicated at 11, for facilitating the attachment of a line pipe thereto for carrying fluid to a pair of brakes. The cylinder is interiorly threaded at each end, as indicated at 12, and these ends are closed by the heads 13 and 14, each of which has a portion for threaded extension into the cylinder 8 and a surrounding flange 15 which compresses a gasket 16, against the adjacent end of the cylinder to form a leak-proof joint. The head 13 closes the inlet end of the cylinder 8 and is provided with an inlet passage 17 which leads into the interior of the cylinder 8 through the reduced tubular extension 18 which is disposed within the cylinder. At the inlet end of the cylinder, a lateral passage 19 is formed which leads through a tapered valve seat 20 into the passage 12, while at the opposite or outlet end of the cylinder 8, an outlet passage 21 is formed which passes laterally from the cylinder into the passage 10. Directly opposite the outlet lateral passage 21 is a passage 22 leading to the exterior of the unit and which is closed by the plug 23.

In alinement with the passage 19 is a valve screw 24 which is threaded through the wall of the portion 9 and has a tapered inner end 25 which is adapted to engage the seat 20 for the purpose of normally maintaining the passage 19 closed. The outer end of this valve screw 24 is suitably formed with a head to facilitate turning the screw and a packing nut 26 surrounds the valve screw and compresses the packing 27 about the screw so as to prevent leakage around the threads thereof.

Within the cylinder 8 is a piston which is designated as a unit by the numeral 29 and which comprises a relatively thick central body 30 having a rubber or other suitable type of packing disc 31 disposed against each side face. Upon the inlet side of the piston 29 a helical expansion spring 32 encircles the extension 18 and bears at one end against the head 13, while its other end is joined to a plate 33 which bears against the adjacent gasket or packing disc 31.

At the opposite side of the piston 29, a helical expansion spring 34 is disposed which bears at one end against the head 14 and has its opposite end secured to the plate 35 which bears against the adjacent disc 31. The spring 34 is of slightly greater strength than the spring 32 so that it will assist in equalizing the pressure in the system when the foot pedal 2 is released, as will be hereinafter more fully apparent.

The inner face of the head 14 has fitted thereinto, one end of a movement limiting plug 36 which controls the extent to which the piston 29 may move. This plug is threaded into the head 14, as illustrated, and has threaded thereon the locking ring or nut 37.

In installing the fluid control units 7 in the braking system, the inlet heads 13 are coupled as closely as possible to the master cylinder at the outlet thereof, so that the fluid ejected from the master cylinder will pass immediately into the control cylinders. The control cylinders are also mounted so that the longitudinal passage 10 will be disposed upon the top of the cylinder. The pipe lines leading to the front and rear brake cylinders are coupled each with the outlet end of the passage 10 of a control cylinder. After the control cylinders have been mounted in operative position, the system is filled in the following manner. The air outlet valve which forms a standard part of the cylinder associated with each brake is opened and the valve screw 24 is retracted so as to open the passage 19 between the passage 10 and the chamber which is formed between the piston 29 and the head 13. The hydraulic system fluid is then poured into the master cylinder in the usual manner so that as the cylinder fills, the fluid will pass through the passage of the inlet head 13 and fill the area between this head and the piston 29. As the said area is filled with the fluid, the air therein will be forced outwardly ahead of the fluid through the passage 19 and the fluid will follow through this passage and flow through the passage 10 into the area between the piston 29 and the head 14, likewise filling this area and causing all of the air therein to pass out so that when the cylinder 8 is finally filled, there will be no air pockets in the upper part or in any part thereof. Continued introduction of fluid into the master cylinder will then cause the passage 10 to fill up and this will fill the pipe lines 4 and 5 and the cylinders associated with the several brakes in the usual manner. As the brake cylinders fill, the air will escape therefrom and the operation of the brake pedal 2 during this filling operation will effect the complete evacuation of all air from the individual brake cylinders and, after this is accomplished, the escape valves of these cylinders are closed in the usual manner and the system is ready for operation. However, before it is put into operation, the valve screw 24 is threaded inwardly so as to shut off the passage 19, thus completely separating the fluid of the lines 4 and 5 from one another and from the fluid in the master cylinder.

From the foregoing it will be apparent that when the foot pedal of the braking system is depressed, the fluid in the master cylinder will be moved toward the piston 29 and a portion of the fluid will enter the chamber between this piston and the head 13. The movement of the piston 29 in each of the units will thus effect the expulsion of a portion of the fluid from the chamber in each cylinder in which the spring 34 is located, forcing the fluid into the lines 4 and 5 for the operation of the brakes. It will thus be apparent that the two lines 4 and 5 are completely separated one from the other and from the master cylinder so that should either of the lines break or spring a leak, the operation of the other line by the master cylinder will not be affected, because the fluid from the other line and the fluid from the master cylinder cannot leak out.

The movement of the piston 29 in the control cylinder is, of course, opposed by the spring 34 and assisted by the lighter spring 32 and when the pressure upon the foot brake 2 is released, the return of the foot brake to its normal position under the action of the usual control spring therefor will be assisted by the stronger spring 34 which will tend to shift the piston 29 back to its original position in the cylinder 8 where the plate 33 will abut the extension 18 of the head 13. This extension, as well as the longitudinally adjustable plug 36, prevents the piston 29 moving to extreme positions in the cylinder where it would close the passages 19 and 21.

It will also be obvious that with the construction shown, a stock size fluid control unit may be made which will be adaptable to all types of cars because of the provision of the plug 36, whereby the degree of movement of the piston 29 and of the brake controlling fluid may be regulated. It will be noted that adjustments may be made of the plug 36 to control the degree of movement of the piston 29 without requiring the draining of the entire braking system as the head 14 may be removed for the adjustment of the plug 36 without affecting the fluid upon the opposite side of the piston 29.

What I claim is:

1. A fluid control unit of the character described, comprising a cylinder, a head threadably connected with the cylinder at one end and closing the same, said head having an inlet passage therethrough, a central extension upon the inner end of said head which projects into the cylinder, a second head detachably coupled with and closing the other end of the cylinder, a body carried by the second mentioned head upon the inner side thereof and adjustable relative to the head and longitudinally within the cylinder, a piston in the cylinder movable between said body and the extension of the first mentioned head, means forming a passageway longitudinally of the cylinder, said passageway being open to form an outlet at the end of the cylinder adjacent the second mentioned head and having laterally extending end passages leading into the cylinder, and valve means for closing the lateral passage which is at the end of the cylinder adjacent the first mentioned head.

2. A fluid control unit of the character described, comprising a cylinder, a head threadably connected with the cylinder at one end and closing the same, said head having an inlet passage therethrough, a central extension upon the inner end of said head which projects into the cylinder, a second head detachably coupled with and closing the other end of the cylinder, a body carried by the second mentioned head upon the inner side thereof and adjustable relative to the head and longitudinally within the cylinder, a piston in the cylinder movable between said body and the extension of the first-mentioned head, means forming a passageway longitudinally of the cylinder, said passageway being open to form an outlet at the end of the cylinder adjacent the second mentioned head and having laterally extending end passages leading into the cylinder, valve means for closing the lateral passage which is at the end of the cylinder adjacent the first mentioned head, and a spring element in the cylinder at each side of the piston and exerting opposing pressures thereon, that spring element in the end of the cylinder adjacent the second mentioned head being of greater strength than the other spring element.

3. A line control unit for use in a fluid brake system, comprising a cylinder having end heads, a piston in the cylinder, means forming a fluid passage extending longitudinally of the cylinder, the cylinder when in use having said passage upon the top thereof, fluid inlet means at one end of the cylinder, a fluid passage leading directly from each end of the cylinder upwardly into said first passage, said upward passages being the sole fluid connecting means between the cylinder and the first passage, means for closing that upward passage nearest the inlet, and fluid lead-off means at the other end of the cylinder from the inlet and so arranged that fluid in the end of the cylinder nearest thereto must flow through the nearest upward passage before reaching the lead-off.

4. A control unit for a line of a fluid brake system, comprising a cylinder having opposite end heads, a piston movable in the cylinder, means for introducing fluid into the cylinder through one end head, means forming a passage longitudinally of the cylinder which is at the top of the cylinder when the same is in working position, said cylinder having a passage at each end leading through the wall thereof directly from the interior of the cylinder into the first passage, said last stated passages constituting the sole outlets for the cylinder, the piston being movable only between said outlets, means for closing the cylinder outlet passage nearest to the inlet, and an outlet for the first passage adjacent the other end head.

5. A control unit for a line of a fluid brake system, comprising a cylinder having opposite end heads, a piston movable in the cylinder, means for introducing fluid into the cylinder through one end head, means forming a passage longitudinally of the cylinder which is at the top of the cylinder when the same is in working position, said cylinder having a passage at each end leading through the wall thereof directly from the interior of the cylinder into the first passage, said last stated passages constituting the sole outlets for the cylinder, means in the cylnder at each end for limiting movement of the piston between said wall passages, means for closing the cylinder outlet passage nearest to the inlet, and an outlet for the first passage adjacent the other end head.

6. A control unit for a line of a fluid brake system, comprising a cylinder having opposite end heads, a piston movable in the cylinder, means for introducing fluid into the cylinder through one end head, means forming a passage longitudinally of the cylinder which is at the top of the cylinder when the same is in working position, said cylinder having a passage at each end leading through the wall thereof directly from the interior of the cylinder into the first passage, said last stated passages constituting the sole outlets for the cylinder, means in the cylinder at each end for limiting movement of the piston between said wall passages, one of said means being adjustable longitudinally of the cylinder, means for closing the cylinder outlet passage nearest to the inlet, and an outlet for the first passage adjacent the other end head.

SHERIDAN E. SNYDER.